United States Patent [19]

Cassese

[11] Patent Number: 4,869,539
[45] Date of Patent: Sep. 26, 1989

[54] SUPPORTING STRUCTURE FOR A MOTOR VEHICLE

[75] Inventor: Ferdinando Cassese, Modena, Italy

[73] Assignee: Ferrari Engineering S.p.A., Modena, Italy

[21] Appl. No.: 207,515

[22] Filed: Jun. 16, 1988

[30] Foreign Application Priority Data

Jun. 16, 1987 [IT] Italy ..................... 67509 A/87

[51] Int. Cl.⁴ ................................. B62D 27/04
[52] U.S. Cl. ..................... 280/781; 280/784; 280/788
[58] Field of Search ........... 280/781, 666, 282, 788, 280/784; 180/210; 296/185, 197, 205

[56] References Cited

U.S. PATENT DOCUMENTS

| | | | |
|---|---|---|---|
| 4,151,920 | 5/1979 | Shoup | 280/781 |
| 4,488,732 | 12/1984 | Lehmann | 280/781 |
| 4,521,049 | 6/1985 | Genma | 280/781 |
| 4,662,467 | 5/1987 | Arai et al. | 280/781 |

Primary Examiner—Richard A. Bertsch
Attorney, Agent, or Firm—Shlesinger & Myers

[57] ABSTRACT

A support structure for a motor vehicle that includes a passenger compartment and is resiliently connected to the vehicle wheels by front and rear suspensions. The structure includes a central frame which defines the passenger compartment of the vehicle. In addition, the structure includes front and rear frames which are connected by respective resilient connection devices to the front and rear of the central frame. The front and rear frames are provided with attachment devices for connecting with the front and rear suspension, respectively. The rear frame supports the motor vehicle engine, the rear differential and the torque divider, and the front frame supports the other transmission members, such as the front differential.

19 Claims, 6 Drawing Sheets

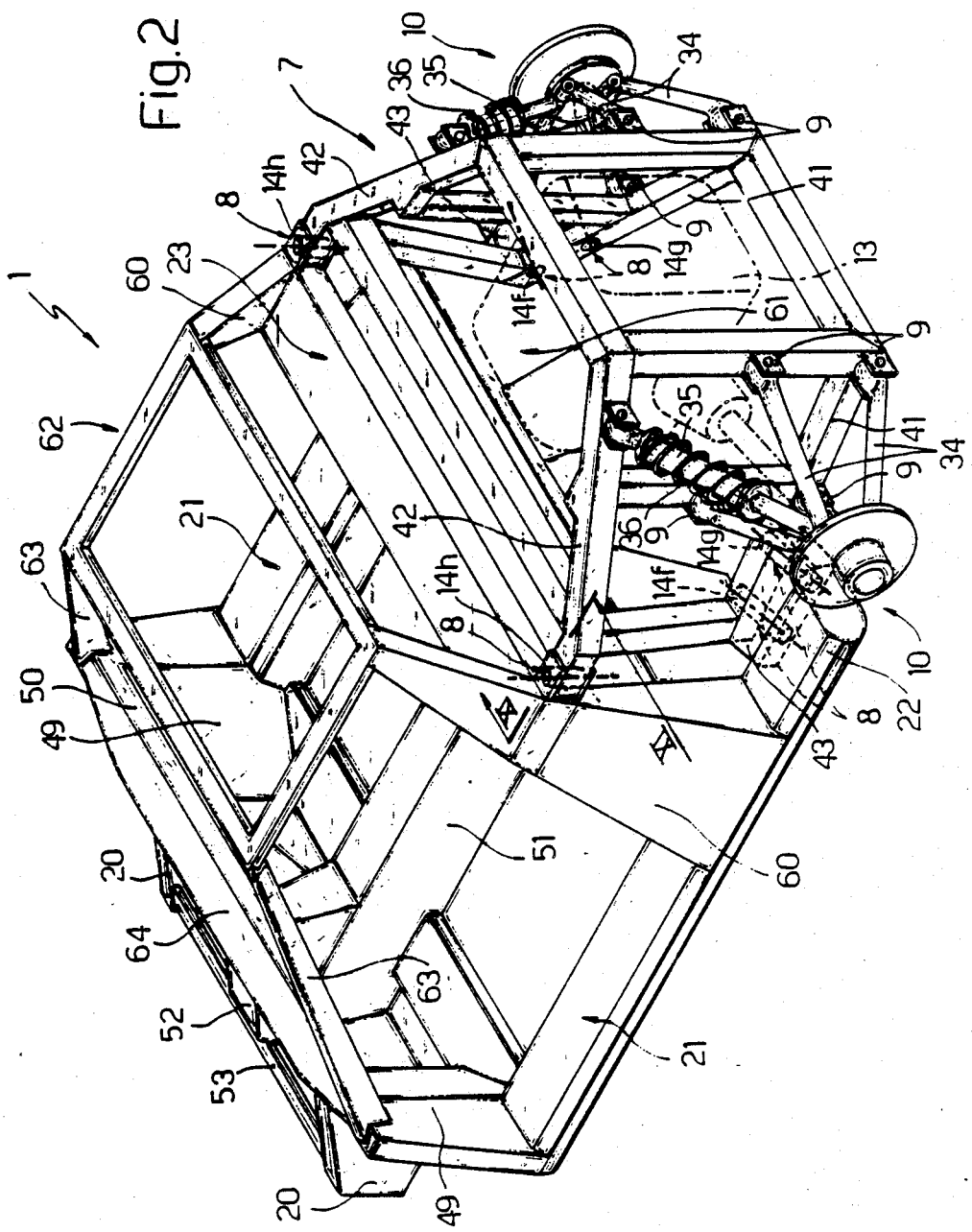

SUPPORTING STRUCTURE FOR A MOTOR VEHICLE

BACKGROUND OF THE INVENTION

The present invention relates to a supporting structure for a motor vehicle, in particular a high powered motor vehicle with sporting characteristics provided with integral four wheel drive.

Supporting structures utilised in motor vehicles of this type comprise a frame obtained by rigidly connecting together, normally by means of welding, sheet metal and metal profiles of various form obtained by cutting and drawing operations. The wheels are resiliently connected to this structure by suitable suspension members such as pivoted arms, shock absorbers, coil springs, which are normally pivotally fixed to suitable regions of the structure itself. The engine and the transmission members such as the gear box, the differential units and the torque dividers are also directly connected to the structure itself with the interposition of suitable supports of deformable material.

Supporting structures of the type described have numerous disadvantages.

First of all, the rigidity of this structure, in particular in the regions where the suspension is attached, is not sufficiently high to avoid the occurrence of local deformations which alter the initial geometric conditions of the suspension and therefore detrimentally affect both the road holding and the driving precision. This disadvantage is particularly marked in motor vehicles with sporting characteristics having high powered propulsion and provided with integral four wheel drive.

Moreover, with supporting structures of this type there is only a modest ride comfort because of the vibrations which are transmitted to the passenger compartment by the suspension and by the engine; in fact the rigidity of such suspension must be rather high in order to maintain correct road holding, and the engine, which is normally disposed in the rear-central part of the motor vehicle, transmits significant vibrations to the passenger compartment.

Finally, supporting structures of the type briefly described are constructionally rather complex because of the large number of parts of which they are composed and because of the form which some of these parts have; the cost of this structure is therefore very high both because of the cost of the associated fittings which must be numerous and complex and because of the amortisation costs of these which is consequent on the small number of production units of motor vehicles of this type.

SUMMARY OF THE INVENTION

The object of the present invention is that of providing a supporting structure for a motor vehicle of the type first indicated which will be free from the disadvantages which have been described.

This supporting structure for a motor vehicle, provided with a passenger compartment and resiliently connected to the wheels by means of front and rear suspensions, is characterised by the fact that it comprises a central frame to define the said passenger compartment, a front frame connected by first resilient connection means to the front part of the said central frame and provided with first attachment means for the said front suspension, and a rear frame connected by second resilient connection means to the rear part of the said central frame and provided with second attachment means for the said rear suspension, the said rear frame supporting the engine of the motor vehicle and some of the transmission members and the said front frame supporting the other transmission members.

BRIEF DESCRIPTION OF THE DRAWINGS

For a better understanding of the present invention a more detailed description of it will now be given by way of example with reference to the attached drawings, in which:

FIG. 2 is a rear perspective view of another part of the same structure;

DETAILED DESCRIPTION OF THE INVENTION

Figure 1:
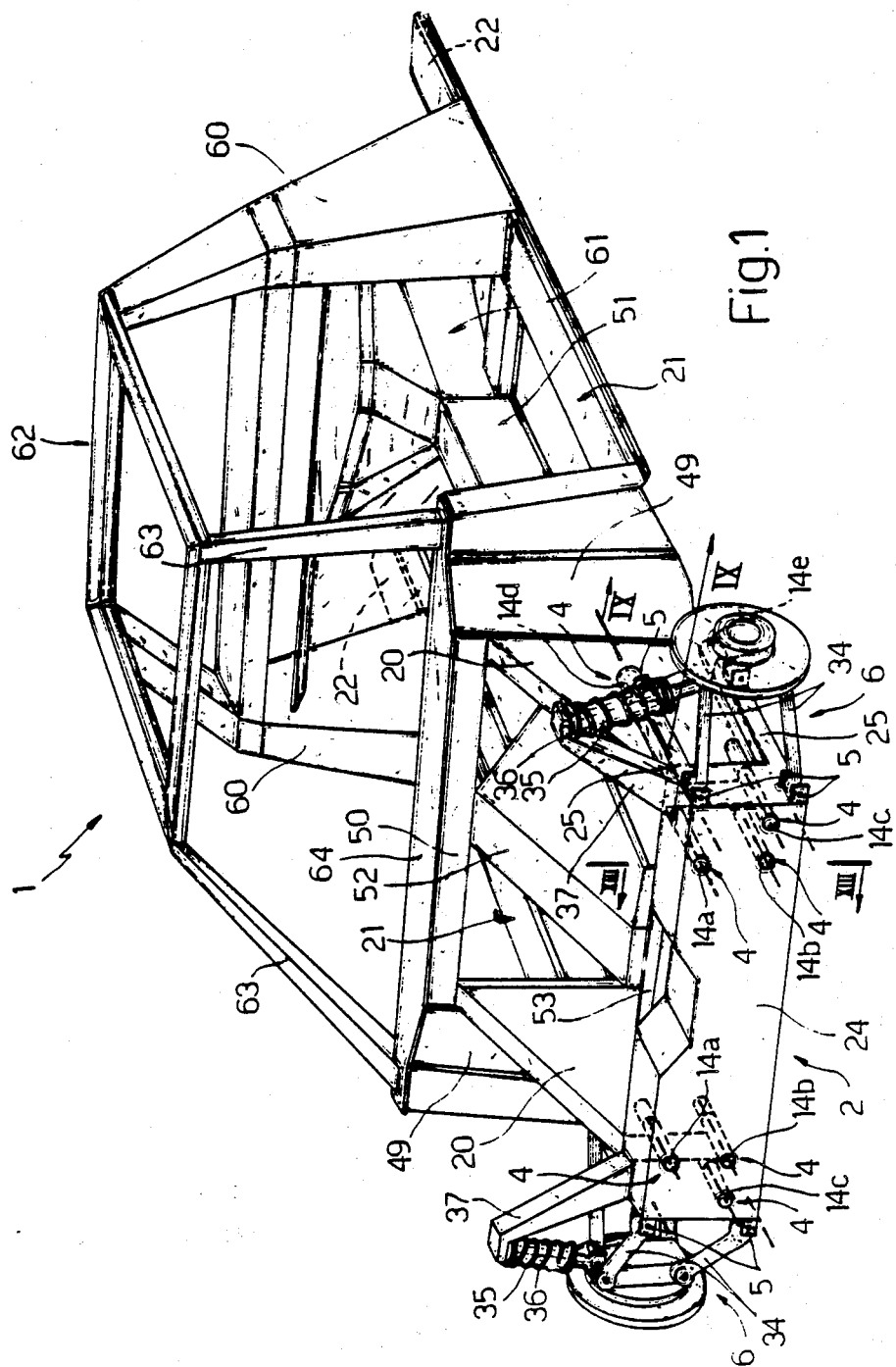
FIG. 1 is a front perspective view of part of the supporting structure of the invention.

First, with reference to FIGS. 1 and 2 of the attached drawings, the supporting structure of the invention substantially comprises a central frame 1 which is adapted to define a passenger compartment for the motor vehicle, a front frame 2 which is connected by first resilient connection means, generally indicated 4, to the front part of the central frame 1 and which is provided with first attachment means, generally indicated 5, to allow connection to the frame of the front wheel suspensions of the vehicle, which have been indicated with the reference numeral 6. The structure further includes a rear frame 7 (FIG. 2) which is connected to the rear part of the central frame by second resilient connection means 8 and is provided with second attachment means 9 for the rear suspensions 10 of the motor vehicle.

The rear frame is arranged to support the engine 13 (FIG. 2) of the motor vehicle and some of the transmission members, such as the gear box, the rear differential, and the torque divider, whilst the front frame 2 is adapted to support the other members of the transmission such as the front differential unit.

As will be better described below, the resilient connection means 4 and 8 substantially comprise a plurality of sleeves 14 (FIGS. 8, 9, 10 and 11) made of resilient material, for example of rubber or an elastomeric or plastics material, each of which is fitted onto a pin 15 fixed to one of the first mentioned frames and is housed in a corresponding seat 16 of a support member fixed, in turn, to another of the frames. The sleeve 14, the length of which is chosen in dependence on the stresses which it must resist, is directly vulcanised onto a pair of inner and outer metal bushes 17 as is clearly seen in the details which have been shown in Figures from 8 to 11.

The central frame 1 includes at least one pair of substantially parallel attachment beams 20 (FIG. 1) which project from the front frame 1 in the direction of the longitudinal axis of this, and at least one pair of longitudinal side members 21 parallel to the said direction, which delimit the bottom of the frame itself; each of these longitudinal side members has an attachment end 22 projecting rearwardly of the frame.

The central frame 1 further has at least one attachment cross member 23 orthogonal to the longitudinal axis of the structure and disposed above the longitudinal side members 21 and at a predetermined distance from them as is clearly seen in FIG. 2. The first resilient connection means 4 are interposed between the attachment beams 20 and the front frame 2, whilst the second resilient connection means 8 are interposed between the rear frame 7, the attachment ends 22 of the longitudinal side members 21, and the attachment cross member 23.

Figure 6:
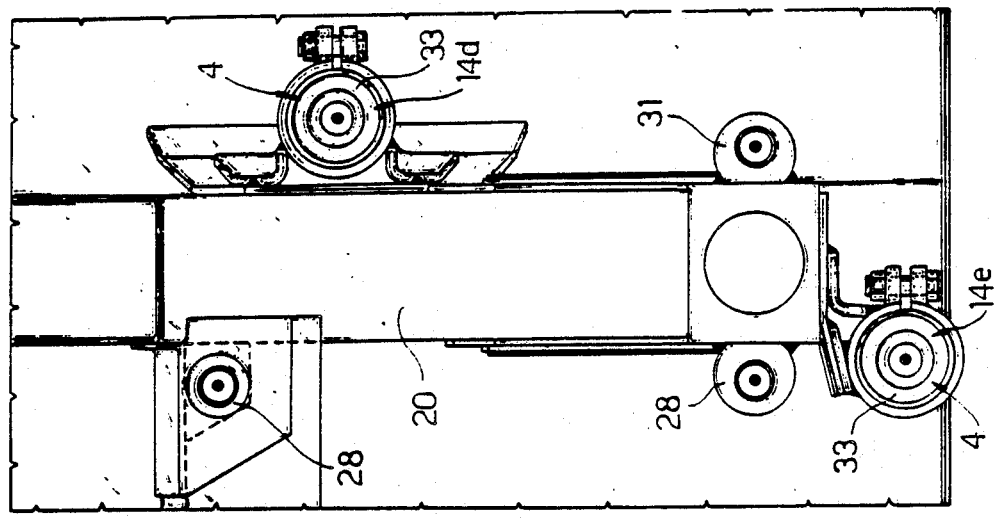
FIG. 6 is a front view of the central frame of the structure of the invention.
Figure 7:
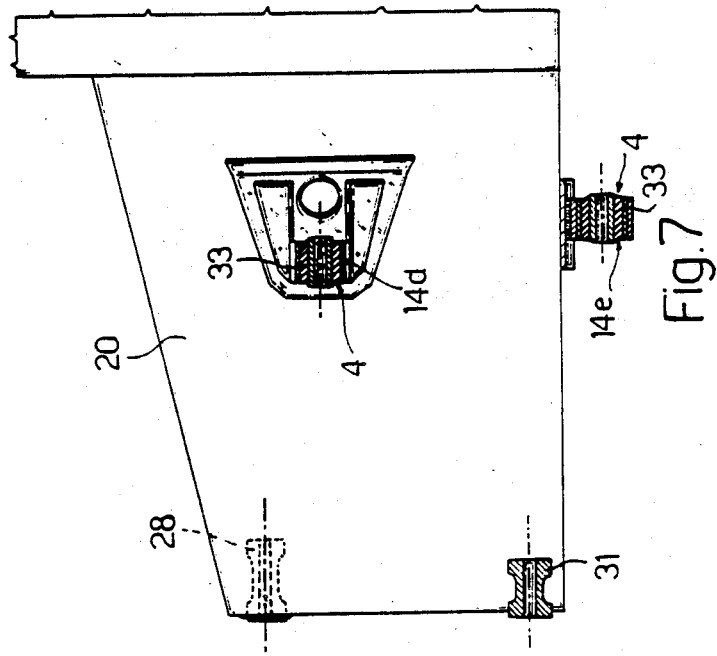
FIG. 7 is a side view of that part of the structure shown in FIG. 6.
Figure 9:
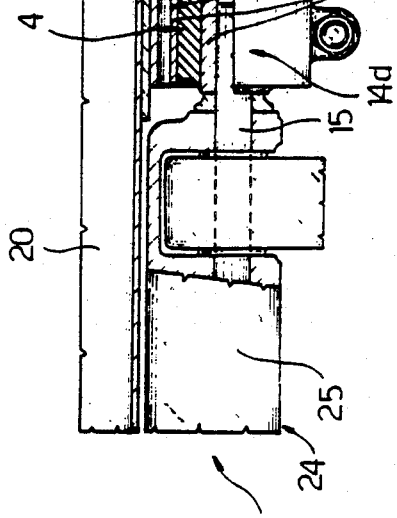
FIG. 9 is another section showing a detail of the structure of FIG. 1, taken on the line IX—IX of FIG. 1.
Figure 8:
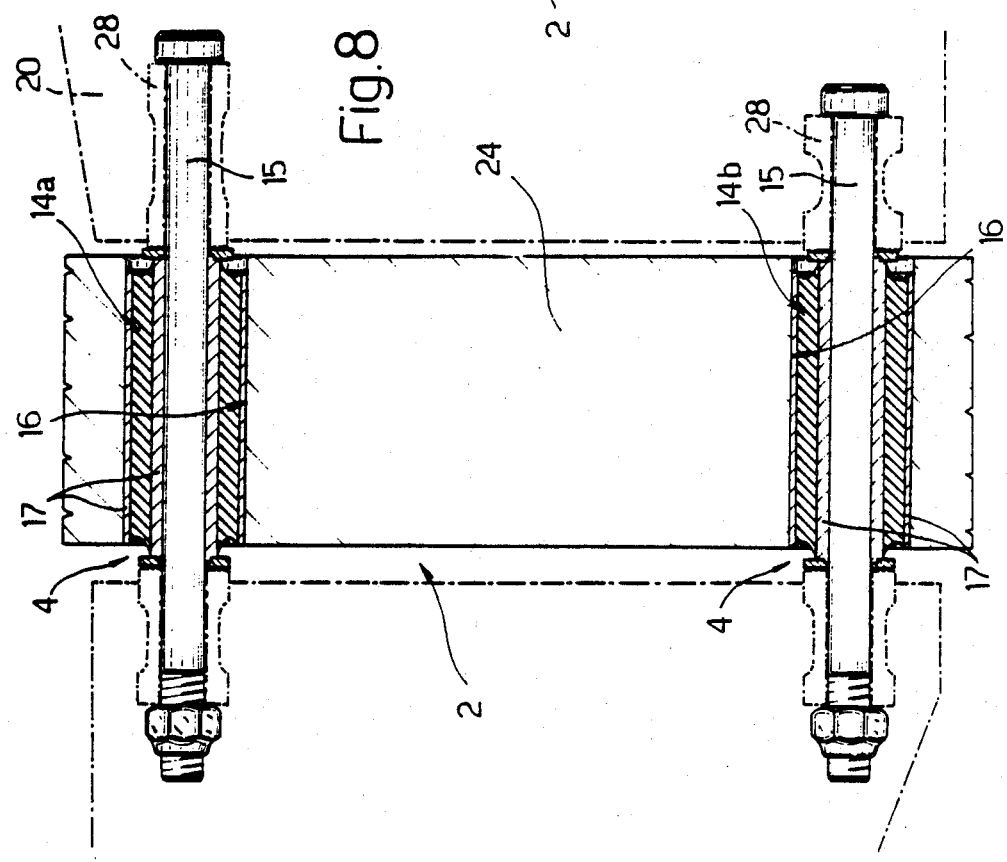
FIG. 8 is a section showing the structure of FIG. 1, taken on the line VIII—VIII of FIG. 1.
Figure 10:
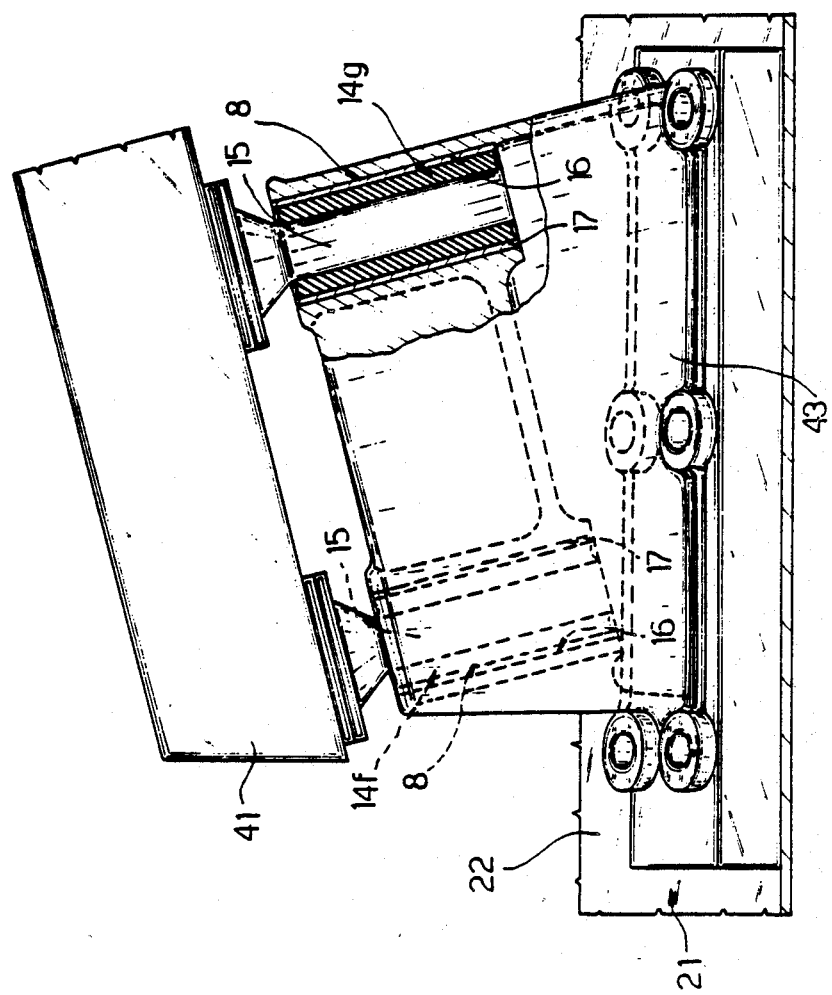
FIG. 10 is a plan view of a detail of the connection between the central frame and the rear frame of the structure of the invention.

The front frame 2 substantially comprises a plate 24 which is adapted to be carried at the ends of the attachment beams 20 as is clearly seen in FIG. 1, and at least two pairs of arms 25 each of which is substantially orthogonal to the plate 24 and can lie along the outer lateral surface of a corresponding attachment beam 20. Conveniently the first resilient connection means 4 include a first series of six sleeves 14a, 14b, 14c disposed substantially in the plane of the plate 24 and adapted to connect this to the attachment beams 20: three sleeves of this series are disposed on each side of the plate. In particular the sleeves 14a and 14b (FIG. 8) have axes contained in the same vertical plane, are housed directly within the holes 16 of the plate, and are traversed by a corresponding pin 15 which is fixed to the interior of a bush 28 (FIGS. 6 and 8) welded on the inner surface of a corresponding beam 20. The other sleeve 14c (FIGS. 6 and 7) of the first series is also housed within a corresponding hole in the plate 24 and is supported by a pin 15 fixed to the interior of a small bush 31 (FIGS. 6 and 7) which is connected to the outer surface of a beam 20.

The first resilient connection means 4 further include a second series of sleeves, indicated 14d and 14e (FIGS. 6 and 7) which are disposed substantially in a single vertical plane and are adapted to connect the arms 25 of the front frame 2 to the beams 20. The sleeves of this second series are conveniently fixed one to the outer lateral surface of a beam 20 and the other to the lower surface of the beam itself, as is clearly seen in FIGS. 6 and 7; each of these sleeves is conveniently fixed to the interior of a corresponding resilient bush 33 fixed in turn to the beam 20.

As is clearly seen in FIG. 1, all the axes of the sleeves 14 which form part of the first resilient connection means 4 have parallel axes.

The front suspensions 6 conveniently comprise a pair of pivoted arms 34 (FIG. 1), a shock absorber 35, a coil spring 36 and other parts not shown; the means 5 for attachment of each of these suspensions to the front frame 2 includes pivots fixed to the frame itself, whilst the upper ends of the shock absorbers 35 and of the spring 36 are pivoted, in a manner known per se, to the upper end of an arm 37 of the front frame 2.

The rear frame 7 (FIG. 2) includes at least one pair of lower longitudinal side members 41 and a pair of upper longitudinal side members 42 which respectively delimit the top and the bottom of the frame itself; the second resilient connection means 8 includes a first series of four sleeves indicated 14f and 14g (FIGS. 1 and 10) adapted to connect the lower longitudinal side members 41 to the attachment ends 22 of the central frame and a second series of two sleeves 14h (FIGS. 1 and 11) adapted to connect the upper longitudinal side members 42 to the attachment cross beam 23 of the central frame 1.

Between each end of a longitudinal side member 41 and the attachment end 22 are interposed two sleeves 14f and 14g (FIG. 10) and conveniently between the longitudinal side member and the end there is interposed a small attachment plate 43; this is shaped in such a way as to form a pair of seats within which the sleeves 14f and 14g traversed by the pins 15 fixed to the longitudinal side members 41 are housed.

Figure 11:
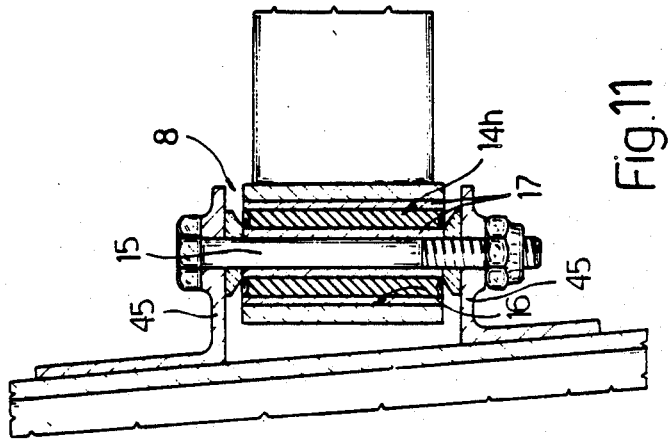
FIG. 11 is another detail of the connection between the said central and rear frames of the structure of the invention.

Each of the sleeves 14h is conveniently connected to the attachment cross beam 23 by means of a fork 45 (FIG. 11).

As is apparent from FIG. 2 the axes of the sleeves 14f and 14g of the first series lie in a single substantially horizontal plane whilst the axes of the sleeves 14h of the second series are orthogonal to the said plane.

Figure 4:
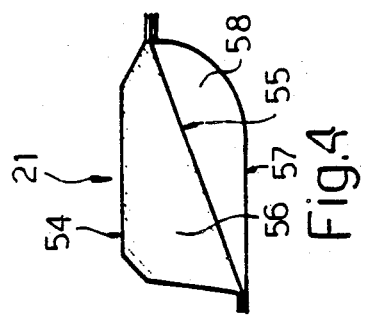
FIG. 4 is a section showing part of the structure of FIG. 3, taken on the line IV—IV.
Figure 3:
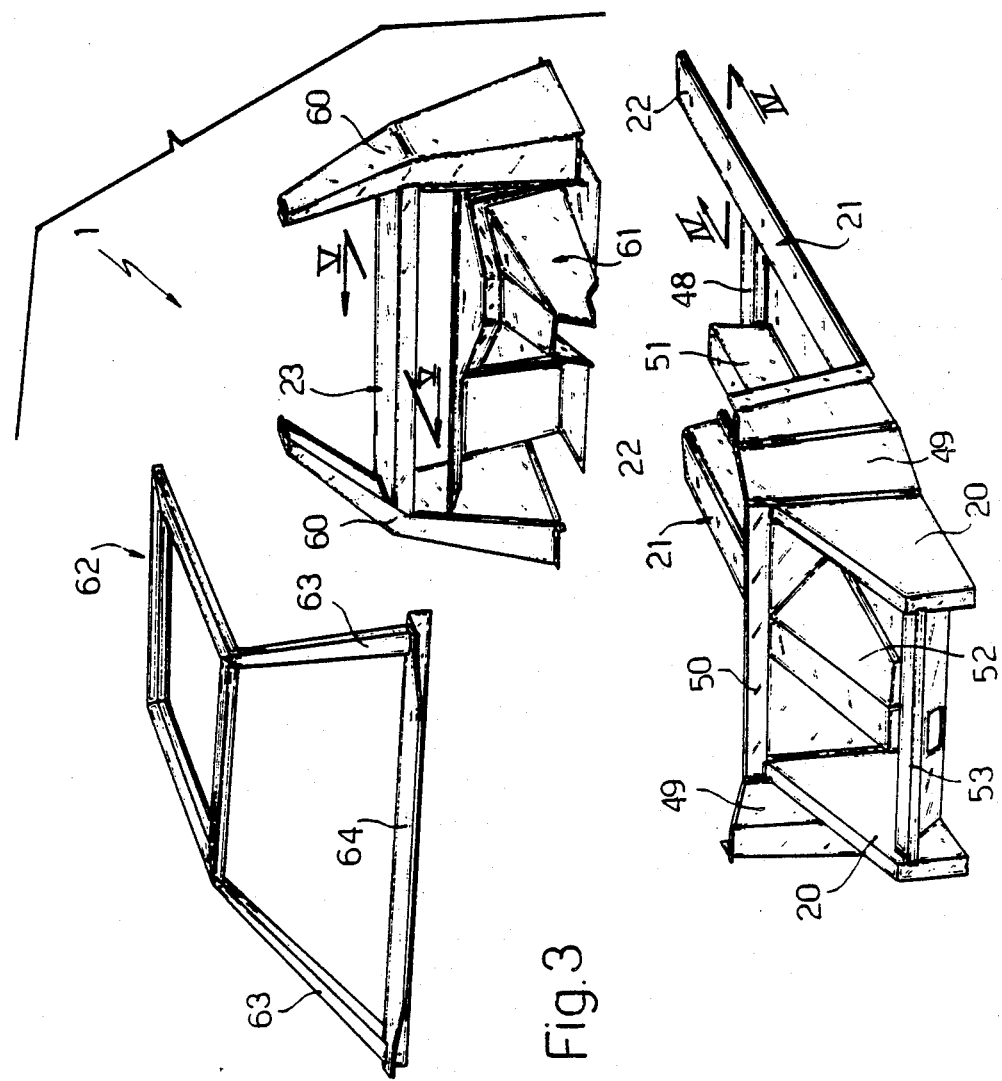
FIG. 3 is a perspective view of the supporting structure of the invention with some of its constituent parts shown separated.

The central frame 1, as is clearly seen from FIGS. 2 and 3, includes a pair of cross members 48 connecting together the longitudinal side members 21 of the frame, and a pair of connection plates 49 each of which connects one of these longitudinal side members to one of the attachment beams 20; these connection plates are connected together underneath by one of the cross members 48 (FIG. 2) and above by at least one further cross member 50 (FIG. 3). Moreover, conveniently a channel shape element 51 is connected to the cross member 48 and, in the front part of this and between the beams 20 a box-like element 52 is connected; a further cross member 53 closes the central frame 1 at the front. Each of the longitudinal side members 21 has a tubular form and includes a first elongate element 54 (FIG. 4) having an L-shape section and a second flat elongate element 55 fixed thereto to define a cavity 56 which can be filled with an expanded synthetic material; conveniently each longitudinal side member 21 further includes an elongate covering element 57 (FIG. 4) conveniently made of a synthetic material able to define a longitudinal channel 58 arranged to house the cables and pipes.

The central frame 1 further includes a pair of vertical pillars 60 each of which is connected to one of the longitudinal side members 21; the first mentioned attachment cross member 23 is disposed between these pillars and is fixed thereto. Between these pillars and beneath the attachment cross member there is disposed a screening plate 61 suitably shaped to separate the passenger compartment from the engine; it is connected to the attachment cross member 23, to the vertical pillars 60 and to one of the cross members 48.

The central frame 1 also includes an upper closure frame 62 (FIG. 3) of substantially rectangular form, connected to the vertical pillars 60 and, by means of a pair of struts 63 and a cross member 64, to the connection plate 49.

All the parts which have been described and which form part of the central frame 1 (with the exception of the covering elements 57 (FIG. 4) for the longitudinal side members 21) are made of metal, conveniently stainless steel, and are produced by folding flat sheet metal blanks. The considerably simplified form of these parts, visible in the Figures, makes it possible to obtain these parts by folding and bending operations starting from cut out blanks without any need to have recourse to the more complex drawing operations.

The connection of the various parts which constitute the central frame 1 can be achieved in any convenient manner but, preferably, can be constituted by units including some of the parts described, and these can be subsequently connected together. The various parts can be held together during the assembly of the various units and these units can themselves be assembled together to obtain the finished frame, with the use of rivets which are inserted in suitable holes in the parts and subsequently upset. The function of these rivets is to hold the parts and the units joined together in their correct position in which they must be located in the finished frame: subsequently the various parts of each unit and the various units of the frame can be fixed together by welding, for example spot welding or continuous welding with laser welding processes.

The supporting structure thus formed can be completed with closure and cladding elements suitably shaped and constructed in a suitable synthetic material; flat panels of this material can be disposed above the longitudinal side members 21 and the cross members 48 to form the panels of the passenger compartment; other panels of various form, serving as covers, can be fixed to the central, front or rear frame in any suitable way to form the various parts of the motor vehicle body supported by the structure of the invention.

Figure 5:
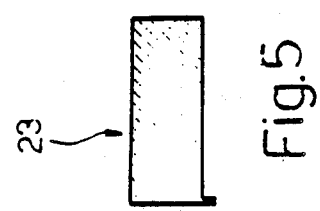
FIG. 5 is another section showing another part of the structure of FIG. 3, taken on the line V—V.

Moreover, parts of the central frame 1 which have cavities or which are of channel form can be suitably filled with an appropriate expanded synthetic material similar to that which has been described for the cavity 56 (FIG. 4) of the longitudinal side members 21; for example, the attachment cross member 23 (FIG. 5) can be filled with such a material.

The supporting structure of the invention allows various important advantages to be obtained which cannot be achieved in prior art structures.

First of all, the road holding and the driving precision achieved on a motor vehicle provided with the structure described are considerably improved. These favourable advantages derive substantially from the high rigidity of both the front frame 1 and the rear frame 7 to which the wheels of the motor vehicle itself are connected via the resilient suspensions 6 and 10. This high rigidity is a consequence of the structure of each of these frames, which allows the attachment points of the suspensions to be maintained in the correct relative position in any operating conditions and over the whole life of the motor vehicle; as is obvious each of these frames behaves substantially as a rigid axle having exceptionally high rigidity so as to prevent any relative displacement of the attachment points themselves in any driving conditions and, therefore, whatever the stresses transmitted to the frames themselves.

Moreover, the suspensions can be mounted on these frames before they are connected to the central frame 1, thus allowing a significant precision and simplicity of assembly, but above all giving the possibility of rigorously monitoring the geometric characteristics of these suspensions.

A motor vehicle provided with the supporting structure described has a good ride comfort even though the suspensions with which the structure is provided may be particularly stiff, as is required for motor vehicles with sporting characteristics. In fact, the central frame 1 is separated from the front frame 2 and the rear frame 7 by the resilient connection means 4 and 8 substantially comprising the various series of resilient sleeves 14 which have been described. These therefore give rise to a further resilient suspension which prevents the transmission of vibrations to the passenger compartment of the motor vehicle and which are produced by the dynamic actions transmitted from the wheels to the front and rear frames or generated by the engine or by the transmission units which are connected, in the manner which has been described, to these frames.

Finally, the supporting structure described can be produced with low production costs since it is composed of parts having a simple form for the manufacture of which no complex equipment is necessary: the front frame 2 can in fact be made by casting, the rear frame by connecting together, for example by welding, a plurality of metal sections of suitable shape and, finally, the central frame comprises only parts which, as has been described, can be produced by simple folding operations starting from sheet metal blanks obtained by cutting. The various parts of the central frame 1 are connected together with considerable precision being held in their relative positions by rivets and being fixed together by laser welding.

It is apparent that the embodiment of the present invention described can have modifications and variations introduced thereto both to its form and to the arrangement of the various parts, without departing from the ambit of the invention itself.

I claim:

1. A supporting structure for a motor vehicle provided with a passenger compartment and resiliently connected to the wheels by a front suspension (6) and a rear suspension (10), characterized by the fact that it comprises a central frame (1) to define the passenger compartment, a front frame (2) connected by first resilient connection means (4) to the front part of the central frame and provided with first attachment means (5) for the front suspension, and a rear frame (7) connected by second resilient connection means (8) to the rear part of the central frame and provided with second attachment means (9) for the rear suspension, the rear frame supporting the engine (13) of the motor vehicle and a first group of the transmission members and the front frame supporting another group of transmission members.

2. A structure according to claim 1, characterised by the fact that the said resilient connection means (4, 8) comprise a plurality of sleeves (14a, b, c, d, e, f, g, h) made of a resilient material, each of which is fitted onto a pin 15 fixed to one of the said frames and is housed in a seat 16 of a support member 28, 31, 33 fixed to another of the said frames.

3. A supporting structure according to claim 2, characterised by the fact that the said resilient material is rubber or an elastomeric material.

4. A supporting structure according to claim 1, characterised by the fact that the said central frame includes at least one pair of parallel attachment beams (20) projecting from the frame itself in the direction of its longitudinal axis, and at least one pair of longitudinal side members (21) parallel to the said direction and delimiting the bottom of the said frame and each of which has an attachment end (22) projecting rearwardly of the frame itself, and an attachment cross member (23) orthogonal to the said direction and disposed above the said longitudinal side members at a predetermined distance therefrom, the said first resilient connection means (4) being interposed between the said attachment beams (20) and the said front frame (2) and the said second resilient connection means (8) being interposed between the said attachment ends (22) and the said rear frame (7) and between the said attachment cross member (23) and the said rear frame (7).

5. A supporting structure according to claim 1, characterised by the fact that the said front frame (2) includes a plate (24) adapted to be carried at the ends of the said beams (20) and at least two pairs of arms (25) substantially orthogonal to the said plate and adapted to lie along the outer lateral surfaces of the said beams, the said first resilient connection means (4) including a first series of sleeves (14a, b, c) disposed substantially in the plane of the said plate and adapted to connect this to the said beams and a second series of sleeves (14d, e) disposed in a plane parallel to the preceding plane and adapted to connect the said arms (25) to the said beams (20).

6. A supporting structure according to claim 5, characterised by the fact that the said first series of sleeves comprises three sleeves (14a, b, c) disposed on each side of the plate (24) and the said second series of sleeves comprises two sleeves (14d, e) able to connect each pair of said arms (25) to the corresponding beam (20).

7. A supporting structure according to claim 5, characterised by the fact that the sleeves of the said two series are disposed with their axes parallel.

8. A supporting structure according to claim 1, characterised by the fact that the said rear frame (7) includes at least one pair of lower longitudinal side members (41) and one pair of upper longitudinal side members (42) which respectively delimit the top and the bottom of the said frame, the said second resilient connection means (8) corresponding to a first series of the said sleeves (14f, g) adapted to connect the said lower longitudinal side members (41) to the said attachment ends (22) of the said central frame and a second series of the said sleeves (14h) adapted to connect the said upper longitudinal side members (42) to the said attachment cross member (23) of the said central frame.

9. A supporting structure according to claim 8, characterised by the fact that the said first series of sleeves (14f, 14g) comprises two pairs of sleeves of which the sleeves of one pair connect the end of one of the said lower longitudinal side members (40) to a corresponding attachment end (22) of the said central frame and the sleeves of the other pair connect the end of the other lower longitudinal side member (41) to the other attachment end (22) of the central frame, the said second series of sleeves (14h) comprising two sleeves each of which connects one end of one of the said upper longitudinal side members (42) to the said attachment cross member (23).

10. A supporting structure according to claim 9, characterised by the fact that the axes of the sleeves of the said first series (14f, 14g) lie in a single horizontal plane and the axes of the sleeves of the said second series (14h) are orthogonal to the said plane.

11. A supporting structure according to claim 1, characterised by the fact that the said central frame includes a pair of cross members (48) connecting together the said longitudinal side members (21) of the frame and a pair of connection plates (49) each of which connects one of the said longitudinal side members (21) to one of the said attachment beams (20), the said connection plates being connected together underneath by one of the said cross members (48) and above by at least one third cross member (50).

12. A supporting structure according to claim 11, characterised by the fact that each of the said longitudinal side members (21) has a tubular form and comprises a first elongate element (54) of L-shape cross-section and a second flat elongate element (55) fixed to the preceding to define a cavity (56) between them, the said cavity being filled with an expanded synthetic material.

13. A supporting structure according to claim 1, characterised by the fact that it includes a pair of vertical pillars (60) each of which is connected to one of the said longitudinal side members (21), the said attachment cross member (23) being disposed between the said vertical pillars and being fixed to them and between the said pillars and beneath the said attachment cross member there being disposed a screening plate (61) connected to the attachment cross member, to the vertical pillars, and to one of the said cross members which connects the said longitudinal side members.

14. A supporting structure according to claim 1, characterised by the fact that it includes an upper closure frame (62) of substantially rectangular form connected to the said vertical pillars (60) and, by means of a pair of struts (63) and a further cross member (62), to the said connection plate (49).

15. A supporting structure according to claim 1, characterised by the fact that the said attachment beams (20), attachment cross member (23), elongate elements of the longitudinal side members (54, 55), cross members (48, 64), connection plates (49), screening plates (61), frame (62) and struts (63) are all formed by folding flat sheet metal blanks.

16. A supporting structure according to claim 1, characterised by the fact that the said attachment beams (20), attachment cross member (23), elongate longitudinal side members (54, 55), cross members (48, 64), connection plates (49), screening plate (61) and struts (63) are connected together by means of rivets which traverse the said sheet metal of two parts connected together and by means of spot welding which joins the said parts.

17. A supporting structure according to claim 1, characterised by the fact that it includes at least one panel of synthetic material adapted to form the panelling of the said passenger compartment and disposed on the said cross member (48) which connects the said longitudinal side members (21).

18. A supporting structure according to claim 1, characterised by the fact that it includes a plurality of panels of synthetic material fixed to it and serving as separation and covering.

19. A supporting structure according to claim 1, characterised by the fact that each of the said longitudinal side members (21) includes a cladding element (57) of elongate form fixed to the said elongate elements (54, 55) and defining with them a duct (58) able to house cables and pipes.

* * * * *